United States Patent [19]

Kurokawa et al.

[11] Patent Number: 4,946,047
[45] Date of Patent: Aug. 7, 1990

[54] FILTER APPARATUS WITH STOP VALVE

[75] Inventors: Toshio Kurokawa; Kazuo Daigo, both of Tokyo, Japan

[73] Assignee: Fuji Photo Film Co., Ltd., Kanagawa, Japan

[21] Appl. No.: 288,172

[22] Filed: Dec. 22, 1988

[30] Foreign Application Priority Data

Feb. 1, 1988 [JP] Japan .................................. 63-21770

[51] Int. Cl.$^5$ ............................................. B01D 35/00
[52] U.S. Cl. .................................... 210/234; 210/432;
210/450; 210/451; 210/452; 210/453;
210/497.01; 210/510.1; 137/549
[58] Field of Search .......... 210/234, 432, 448, 497.01,
210/510.1, 450, 452, 451, 453; 137/544, 549

[56] References Cited

U.S. PATENT DOCUMENTS 2,057,779 10/1936 Jacobs .................................. 210/234
4,615,812 10/1986 Darling .............................. 210/234

Primary Examiner—Jones W. Gary
Assistant Examiner—Matthew O. Savage
Attorney, Agent, or Firm—Sughrue, Mion, Zinn, Macpeak & Seas

[57] ABSTRACT

A filter apparatus having a filter element and a stop valve, both incorporated in a body thereof. By means of an engagement, the stop valve is coupled with a cap which is fitted to a body of the filter apparatus by thread-engagement. When the cap is removed from the body for replacement of the filter element, the stop valve rotates together with the cap to close an inlet port of the filter apparatus. On the other hand, when the cap is fitted to the filter apparatus, the stop valve directs the fluid into the filter apparatus since an opening provided in the stop valve coincides with the inlet port because of rotation of the stop valve.

6 Claims, 4 Drawing Sheets

FILTER APPARATUS WITH STOP VALVE

BACKGROUND OF THE INVENTION

The present invention relates to a filter apparatus which is provided with a stop valve and used for removing foreign substances.

Usually, a filter apparatus has a filter element for straining fluid so as to remove foreign substances therefrom. Because the efficiency of the filter element is reduced gradually by clogging of the filter, the filter element must be replaced with a new filter after a certain amount of fluid has been strained. When replacing the filter element, a cock separately provided in a pipe upstream of the filter apparatus must be closed so that the fluid does not leak from the filter apparatus.

In the conventional filter system described above, the filter apparatus and the cock are separately provided, and, therefore, it is troublesome to close the cock each time the filter element is replaced. If the valve is closed carelessly before the filter element replacement, the fluid will leak from the filter apparatus. Or, if the valve is left closed after the filter element replacement, the fluid will not be strained. Thus, the operation of closing and opening the cock is a disadvantage of the conventional filter apparatus.

It is therefore an object of the present invention to provide a filter apparatus which is provided with a stop valve and which allows for the easy replacement of the filter element.

SUMMARY OF THE INVENTION

For achieving this and other objects and advantages, a filter apparatus of an embodiment according to the present invention is provided with a stop valve therein. The tubular stop valve is rotatably fitted inside a tubular body being open at the top and closed at the bottom and having an inlet port on the side thereof and an outlet port on the bottom thereof. When replacing a filter element with a new one, a cap of the filter apparatus is rotated to be removed and simultaneously the stop valve is rotated together with the rotation of the cap because of engagement of the stop valve with the cap so as to close and open an inlet port provided on the side of the body.

However, if it requires more than one turn to remove the cap, the inlet port opens and closes more than one time, causing the fluid to undesirably leak between the cap and the tubular body. In order to avoid the fluid overflowing and to decrease the amount of rotation of the cap for easy fitting or removing, the amount of rotation $\theta$ of the cap for fitting or removing, according to a preferred embodiment of the present invention, meets the following condition:

$$\theta_1 < \theta < 360 - \theta_1$$

where $\theta_1$ is an angle through which the stop valve is open. As the engagement of the stop valve with the cap should be freely released in an axial direction of the valve, a projection is provided on the under surface of the cap and a pair of notches are provided on the upper end of the stop valve. Two seals are provided preferably between the cap and the filter element and between the cap and the stop valve so as to prevent the fluid from leaking. An inlet pipe is connected to the inlet port to direct the fluid into the filter apparatus and an outlet pipe is connected to the outlet port to allow the fluid to flow from the filter apparatus.

According to the preferred embodiment of the present invention, the opening and closing of the inlet port can be carried out in interlocking movement with the rotation of the cap, omitting the separate provision of a cock for stopping the flow of the fluid, and thus simplifying the operation of the filter element replacement. Further, less than one rotation of the cap for fitting the cap to, or removing the cap from, the filter apparatus is required, making the cap easy to fit and remove. In addition, since less than one turn of the cap is required, opening and closing of the inlet port is not repeated during fitting or removing of the cap, and therefore the fluid will not leak through the gap formed between the loosened cap and the body. A pair of projections and a pair of notches are provided as a simple mechanism for simultaneously moving the stop valve with the cap.

BRIEF DESCRIPTION OF THE DRAWINGS

These and other objects and features of the invention will be understood by reference to the following description, taken in connection with the accompanying drawings in which.

DETAILED DESCRIPTION OF THE INVENTION

Referring now to the attached drawings, a preferred embodiment of a filter apparatus according to the present invention will be described in detail.

Figure 1:
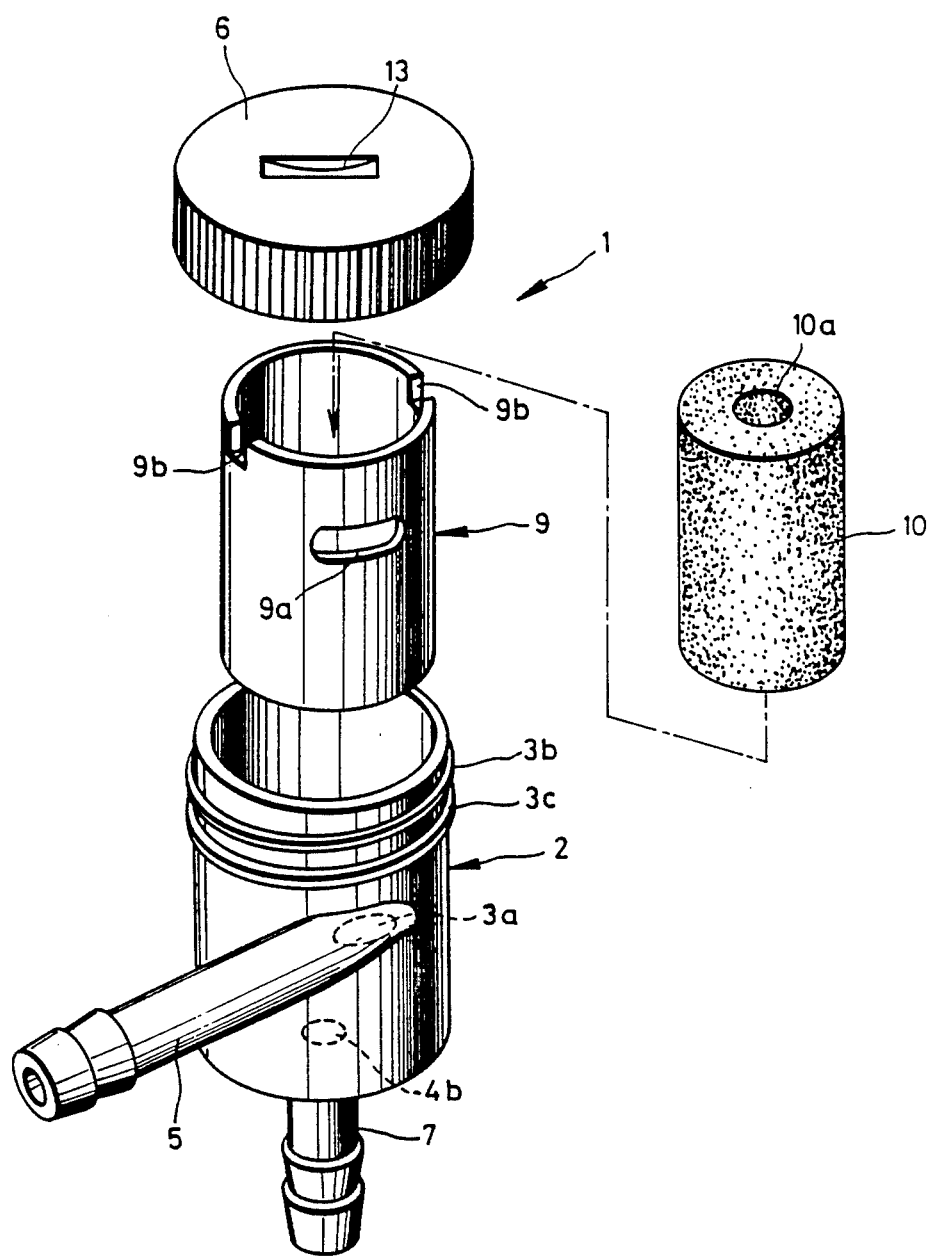
FIG. 1 is an exploded perspective view of an embodiment of a filter apparatus according to the present invention.
Figure 2:
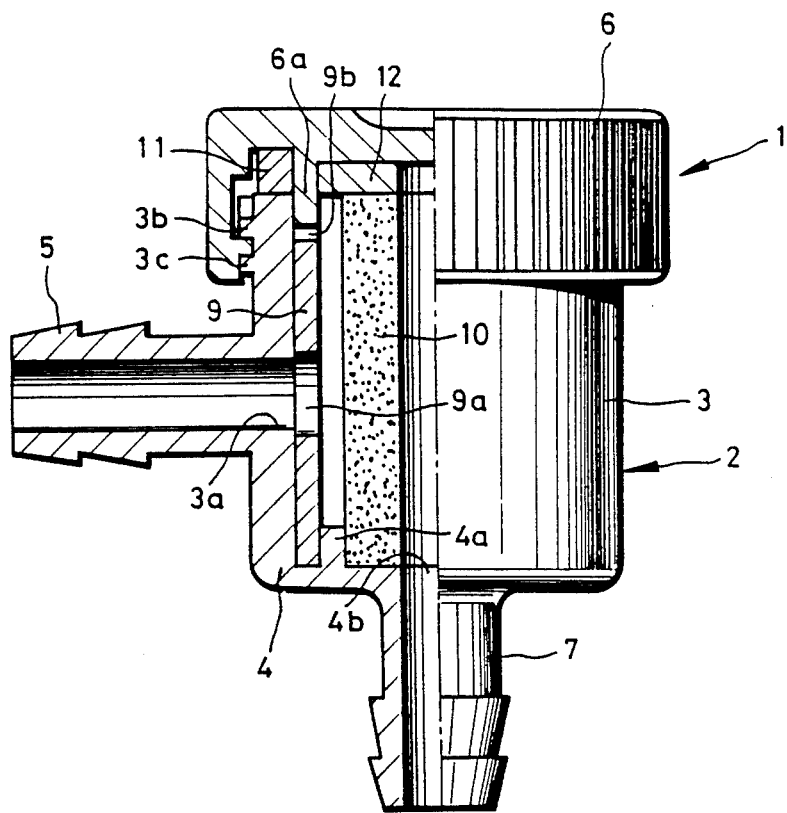
FIG. 2 is a partial cross sectional view of the embodiment of FIG. 1.

FIGS. 1 and 2 illustrate a filter apparatus 1 including a tubular body 2 having an open top. The body 2 comprises a side portion 3 and a bottom portion 4. On the side portion 3, a generally circular inlet port 3a is defined. An inlet pipe 5 is formed integrally with the side portion 3 to communicate with the inlet port 3a. Provided near the upper end of the side portion 3 are threads 3b engageable with threads on a cap 6 and a projection 3c serving as a stopper of the thread engagement. On the inner surface of the bottom portion 4, a circular projection 4a is formed integrally with the bottom portion 4 and an outlet port 4b is defined inside the projection 4a near the center of the bottom portion. The outlet port 4b communicates with an outlet pipe 7 integrally formed with the bottom portion 4.

A stop valve 9 is tubularly shaped and has an oblong opening 9a on a side thereof with its longitudinal axis disposed parallel to the bottom portion of the body 2. At the upper end of the stop valve 9, a pair of notches 9b are defined. The stop valve 9 is rotatably fitted into the body 2, with the outer surface of the stop valve 9 in water-tight contact with the inner surface of the body 2, and with the lower end of the stop valve 9 inserted into a circular groove defined by the lower portion of the inner surface of the body 2 and the circular projection 4a. Only when the oblong opening 9a of the stop valve 9 and the inlet port 4b of the body 2 overlap each other, partially or totally, can the fluid enter the filter apparatus 1.

A tubular filter element 10 is disposed within the body 2 inside the stop valve 9, and is retained by the circular projection 4a so as to be unable to change position. The filter element 10 is made of a porous material such as, for example, a sintered body of polypropylene.

Figure 3:
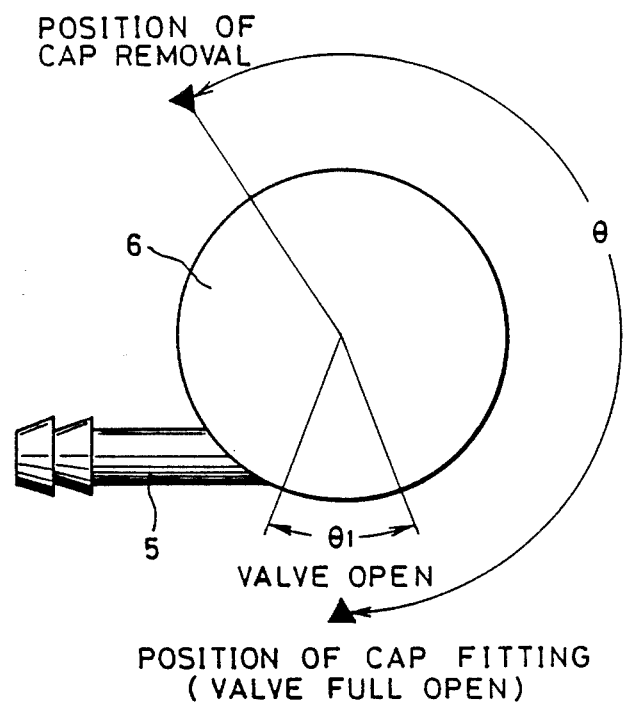
FIG. 3 is an explanatory view showing the relation of cap fitting angle 0 and valve open angle $\theta_1$.

Under the surface of the cap 6, a pair of projections 6a are formed so as to engage with the notches 9b of the stop valve 9 such that the stop valve 9 thereby is rotated together with the cap 6. If a plurality of rotations of the cap 6 is required for securing the cap to, or removing the cap from, the body 2, the opening 9a of the stop valve 9 coincides with the inlet port 3a the same number of times as the number of rotations of the cap, causing the fluid to enter the filter apparatus 1. Therefore, the greater the number of rotations required to secure or remove the cap, the greater the amount of fluid that will leak undesirably from the gap between the cap 6 and the body 2. In order to prevent such leaking and to allow the cap 6 to be easily fitted and mounted, an angle $\theta$ through which the cap 6 rotates when fitted to, or removed from, the body 2 is determined under the following condition:

$$\theta_1 < \theta < 360 - \theta_1$$

where $\theta_1$ is an angle through which the stop valve 9 can rotate while directing the fluid into the filter apparatus 1, as shown in FIG. 3. In this embodiment, the angle $\theta$ is about 220 degrees. The threads provided on the cap 6 and the body 2 are a double-start thread type with 3 mm pitch. For sealing the filter apparatus, two seals 11 and 12 are provided, respectively, between the cap 6 and the upper end of the side portion 3, and between the cap 6 and the top of the filter element 10. A groove 13 is provided for insertion of a blade of a screwdriver to rotate the cap 6.

Figure 4:
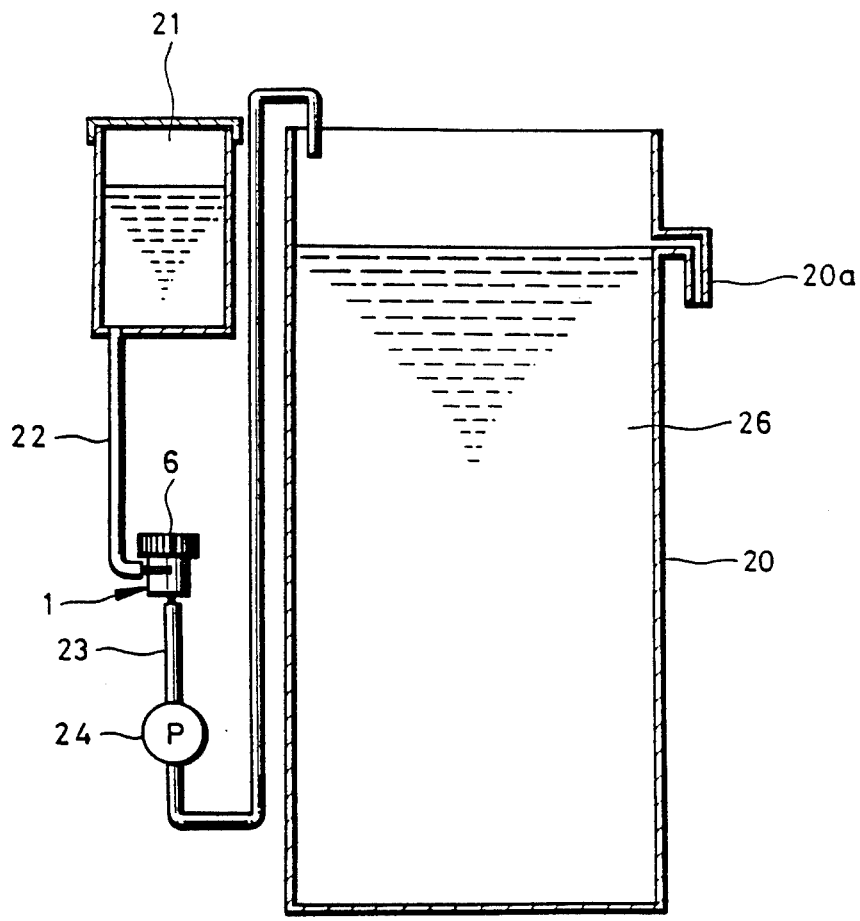
FIG. 4 is an example to which the present invention is applied.

FIG. 4 shows an example of an application of the filter apparatus according to the present invention. In this example, the fluid to be strained is photographic processing solution 26. The photographic processing solution 26 contained in processing tank 20 gradually deteriorates according to the amount of processed photosensitive material. Accordingly, new photographic processing solution contained in a supply tank 21 is supplied into the process tank 20, causing the deteriorated photographic processing solution 26 to overflow into a drain pipe 20a provided on the upper side of the process tank 20. For supplying the new photographic processing solution, the supply tank 21 is connected to the top of the process tank 20 through a pipe 22, a filter apparatus 1, and a pipe 23. At an appropriate position of the pipe 23, a pump 24 is provided to pump the new photographic processing solution.

When the cap 6 is fitted to the body 2, the opening 9a of the stop valve 9 coincides with the inlet port 3a, making it possible to direct the photographic processing solution contained in the supply tank 22 into the space defined between the stop valve 9 and the filter element 10, via the pipe 22, the inlet pipe 5, the inlet port 3a, and the opening 9a. The directed photographic processing solution passes through the filter element 10 in a direction from its outer surface to its inner surface so as to be strained. After passing through the filter element 10, the photographic processing solution is directed to the process tank 20 from the inner space of the filter element 10, through the outlet port 4b, the outlet pipe 7, the pipe 23, and the pump 24.

The filter element 10 must be replaced periodically to avoid deterioration of the straining performance due to clogging of the filter element 10, as described before. For replacement of the filter element 10, the cap 6 is turned counterclockwise in FIG. 3, thereby to rotate the stop valve 9 due to the engagement of the projection 6a with the notches 9b. When the stop valve 9 rotates, the opening 9a of the stop valve 9 is displaced from the inlet port 3a, causing the stop valve 9 to close the inlet port 3a. When the cap 6 is rotated further to a predetermined angle, the cap 6 can be removed from the body 2 while the inlet port 3a is still closed by the stop valve 9, preventing the photographic processing solution from overflowing the body 2.

After the cap 6 is removed, the filter element 10 to be replaced is removed from the body 2 and a new filter element is inserted into the body 2. Next, the cap 6 is placed on the top of the body 2 and rotated until the under surface of the cap 6 abuts against the projection 3c which is provided to stop the cap rotation. Due to the projection 3c, in this condition, the opening 9a is located at the inlet port 3a, thereby directing the photographic processing solution into the filter apparatus 1. The lateral length of the opening 9a is larger than that of the inlet port 3a so that the photographic processing solution may enter the filter apparatus 1 even if the position of the opening 9a of the stop valve 9 deviates from the proper position due to errors in manufacturing the threads.

In the above embodiment, the tubular filter element is disposed in the filter apparatus, and the fluid to be strained radially passes therethrough from its outer surface to its inner surface. However, the filter element may take the form of a disk in which case the fluid would vertically pass therethrough from its top surface to its bottom surface.

Obviously many other modifications and variations of the present invention are possible in light of the above teachings. It is therefore to be understood that, within the scope of the claims, the invention may be practiced otherwise than as specifically described.

What is claimed is:

1. A filter apparatus for filtering a fluid, comprising:
    a tubular body having a closed end and provided with an inlet port and an outlet port, said inlet port being disposed on the side of said tubular body, an upper outer circumference of said tubular body having a first threaded portion;
    a tubular stop valve rotatably disposed in said tubular body, said stop valve having a first engagement portion on the top end thereof and an opening disposed on the side thereof for directing the fluid into said body;
    a filter element contained inside said stop valve and between the inlet port and the outlet port so as to strain all of the fluid directed into said body; and
    a cap having a second threaded portion engageable with the first threaded portion of said tubular body and a second engagement portion engageable with the first engagement portion of said stop valve, wherein said stop valve is rotatable together with said cap due to engagement between the first and second engagement portions, causing the inlet port to be open while the cap is mounted and to be closed when the cap is removed; wherein the first and second threaded portions satisfy the following condition:

$$\theta_1 < \theta < 360 - \theta_1;$$

where $\theta$ is an angle through which said cap must rotate to be fitted to and removed from said body and $\theta_1$ is an angle through which said stop valve rotates while allowing the fluid to enter said body.

where $\theta$ is an angle through which said cap must rotate to be fitted to and removed from said body and $\theta_1$ is an angle through which said stop valve rotates while allowing the fluid to enter said body.

2. A filter apparatus as claimed in claim 1, wherein said filter element is shaped like a tube having a hole which communicates with the outlet port, a space being defined between the filter element and the inside of said stop valve.

3. A filter apparatus as claimed in claim 2, wherein one of the first and second engagement portions is a projection and the other is a notch.

4. A filter apparatus as claimed in claim 3, wherein said filter element is made of porous material.

5. A filter apparatus as defined according to claim 1, wherein said filter element is shaped like a tube having a hole which communicates with the outlet port, a space being defined between the filter element and the inside of said stop valve.

6. A filter apparatus for filtering a fluid, comprising:
a tubular body having a closed end and provided with an inlet port and an outlet port, said inlet port being disposed on the side of said tubular body, an upper outer circumference of said tubular body having a first threaded portion;
a tubular stop valve rotatably disposed in said tubular body, said stop valve having a first engagement portion on the top end thereof and an opening disposed on the side thereof for directing the fluid into said body;
a filter element contained inside said stop valve and between the inlet port and the outlet port so as to strain all of the fluid directed into said body; and
a cap having a second threaded portion engageable with the first threaded portion of said tubular body and a second engagement portion engageable with the first engagement portion of said stop valve, wherein said stop valve is rotatable together with said cap due to engagement between the first and second engagement portions, causing the inlet port to be open while the cap is mounted and to be closed when the cap is removed;
wherein said filter element is shaped like a tube having a hole which communicates with the outlet port, a space being defined between the filter element and the inside of said stop valve, and
wherein seals are respectively provided between the under surface of said cap and the top end of said body, and between the under surface of said cap and the top of said filter element for sealing the filter apparatus; and wherein a circular projection is integrally provided on the inner surface of the bottom of said body so as to maintain said filter element at a predetermined position.

* * * * *